(12) United States Patent
Lawson

(10) Patent No.: US 6,423,932 B1
(45) Date of Patent: Jul. 23, 2002

(54) APPARATUS AND METHOD FOR HIGH SPEED LASER PERFORATION OF WEBS

(76) Inventor: William E. Lawson, 1917 County Rd. I, Somerset, WI (US) 54025

(*) Notice: Subject to any disclaimer, the term of this patent is extended or adjusted under 35 U.S.C. 154(b) by 0 days.

(21) Appl. No.: 09/785,867

(22) Filed: Feb. 16, 2001

(51) Int. Cl.⁷ .............................................. B23K 26/38
(52) U.S. Cl. ................................ 219/121.7; 219/121.71
(58) Field of Search .................... 219/121.6, 121.74, 219/121.7, 121.71; 131/281

(56) References Cited

U.S. PATENT DOCUMENTS

| | | | | |
|---|---|---|---|---|
| 3,594,261 A | * | 7/1971 | Broerman | 219/121.71 |
| 3,808,394 A | * | 4/1974 | Mominee et al. | 219/121.71 |
| 4,302,654 A | * | 11/1981 | Bennett et al. | 219/121.71 |
| 4,507,535 A | * | 3/1985 | Bennett et al. | 219/121.71 |
| 4,843,207 A | * | 6/1989 | Urbanek | 219/121.6 |
| 4,961,080 A | * | 10/1990 | Henderson et al. | |
| 6,038,487 A | * | 3/2000 | Balster et al. | |

\* cited by examiner

*Primary Examiner*—Geoffrey S. Evans
(74) *Attorney, Agent, or Firm*—Kinney & Lange, P.A.

(57) ABSTRACT

An apparatus and method for high speed laser perforation of a web involves a web-bearing cylinder receiving the web in a wrapped spiral pattern. The web-bearing cylinder includes a slit along a circular circumference of the cylinder. A laser guiding tube is provided for propagation of a laser beam within the web-bearing cylinder. An inner cylinder is also provided in the web-bearing cylinder. The inner cylinder has an axis, supports a reflecting mirror adjacent to the laser guiding tube to direct the laser beam in the slit in the web-bearing cylinder, and is rotatable around the axis to adjust an orientation of the reflecting mirror so as to direct the laser beam around the circular circumference of the web-bearing cylinder in the slit.

6 Claims, 2 Drawing Sheets

APPARATUS AND METHOD FOR HIGH SPEED LASER PERFORATION OF WEBS

BACKGROUND OF THE INVENTION

The present invention relates to a high speed laser perforation system, and more particularly to a system employing a novel web feed-through mechanism and laser focusing system to achieve a higher rate of web perforation.

In order to affect the porosity and optical characteristics of web materials, laser systems are often employed to perform high resolution perforation of the webs. Laser systems are quite effective for this purpose because of the minute spacing between holes that can be achieved. For example, laser systems may be operated to form holes in web materials with spacings as low as 0.050 inches between holes.

Existing laser perforation systems typically employ some sort of scanning system or galvo system, utilizing rotatable mirrors, to move the laser beam across the web in a predetermined pattern. However, particularly for relatively wide webs, scanning and galvo systems have significant limitations in the speed at which they are able to move the laser beam across the web while performing high resolution perforation. These limitations are due to the relatively long distance between the focusing lenses and the workpiece for relatively wide webs, and performance requirements of laser perforation systems are dependent on the size of the holes to be formed as well as the required accuracy of hole placement and spacing. For example, conventional galvo systems experience speed limitations for web perforation operations involving 12–20 inch webs having holes with a size of about 10 thousandths of an inch, and for applications involving 2–3 inch webs having holes with a size of about 2–5 thousandths of an inch. Therefore, there is a need in the art for an improved, alternative system for high speed laser perforation of webs that overcomes the deficiencies of existing technology.

BRIEF SUMMARY OF THE INVENTION

The present invention is an apparatus and method for high speed laser perforation of a web. A web-bearing cylinder receives the web in a wrapped spiral pattern, and includes a slit along a circular circumference of the cylinder. A laser guiding tube is provided for propagation of a laser beam within the web-bearing cylinder. An inner cylinder is also provided in the web-bearing cylinder. The inner cylinder has an axis, supports a reflecting mirror adjacent to the laser guiding tube to direct the laser beam in the slit in the web-bearing cylinder, and is rotatable around the axis to adjust an orientation of the reflecting mirror and thereby direct the laser beam around the circular circumference of the web-bearing cylinder in the slit.

DETAILED DESCRIPTION

Figure 1:
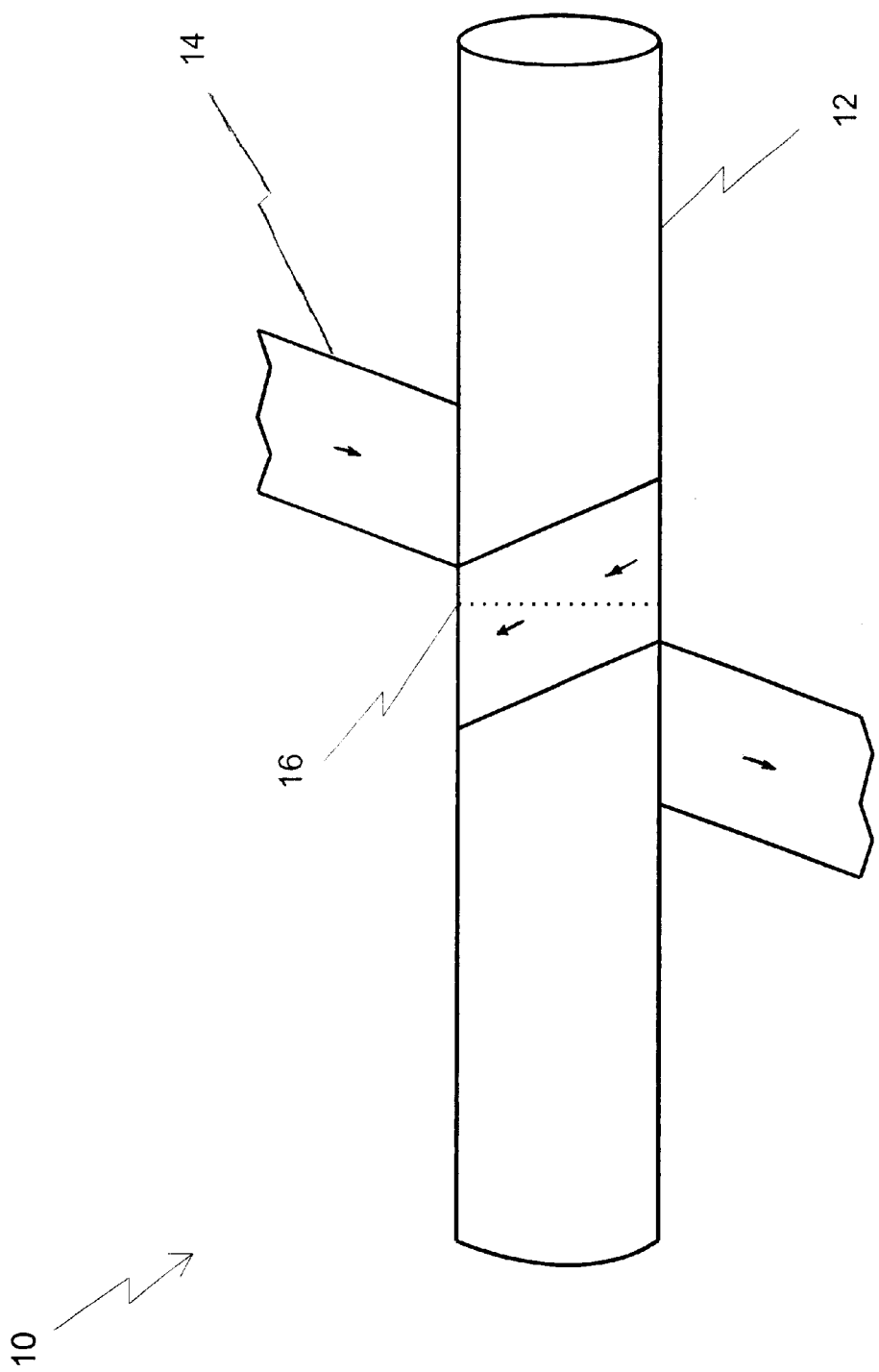
FIG. 1 is a diagram illustrating the web feed-through mechanism of the high speed laser perforation system of the present invention.

FIG. 1 is a diagram of laser perforation system 10 according to the present invention, illustrating the web feed-through mechanism utilized therewith. A web-bearing cylinder 12 is provided to receive web 14, which is wrapped around cylinder 12 in a spiral pattern as shown. Web 14 is longitudinally advanced along cylinder 12 in the direction indicated by the arrows shown in FIG. 1. Slit 16 is formed in cylinder 12 for a pulsed laser beam to impinge upon web 14, thereby perforating web 14 as it is advanced around cylinder 12. Cylinder 12 may include an air-bearing support arrangement on its outer surface to facilitate advancement of web 14 around cylinder 12, or a wheel and pulley arrangement could be used, for example. Several advancement techniques for advancing web 14 around cylinder 12 are known in the art, and the use of any such technique is contemplated by the present invention. The system for focusing the laser beam in slit 16 is shown in detail in FIG. 2.

Figure 2:
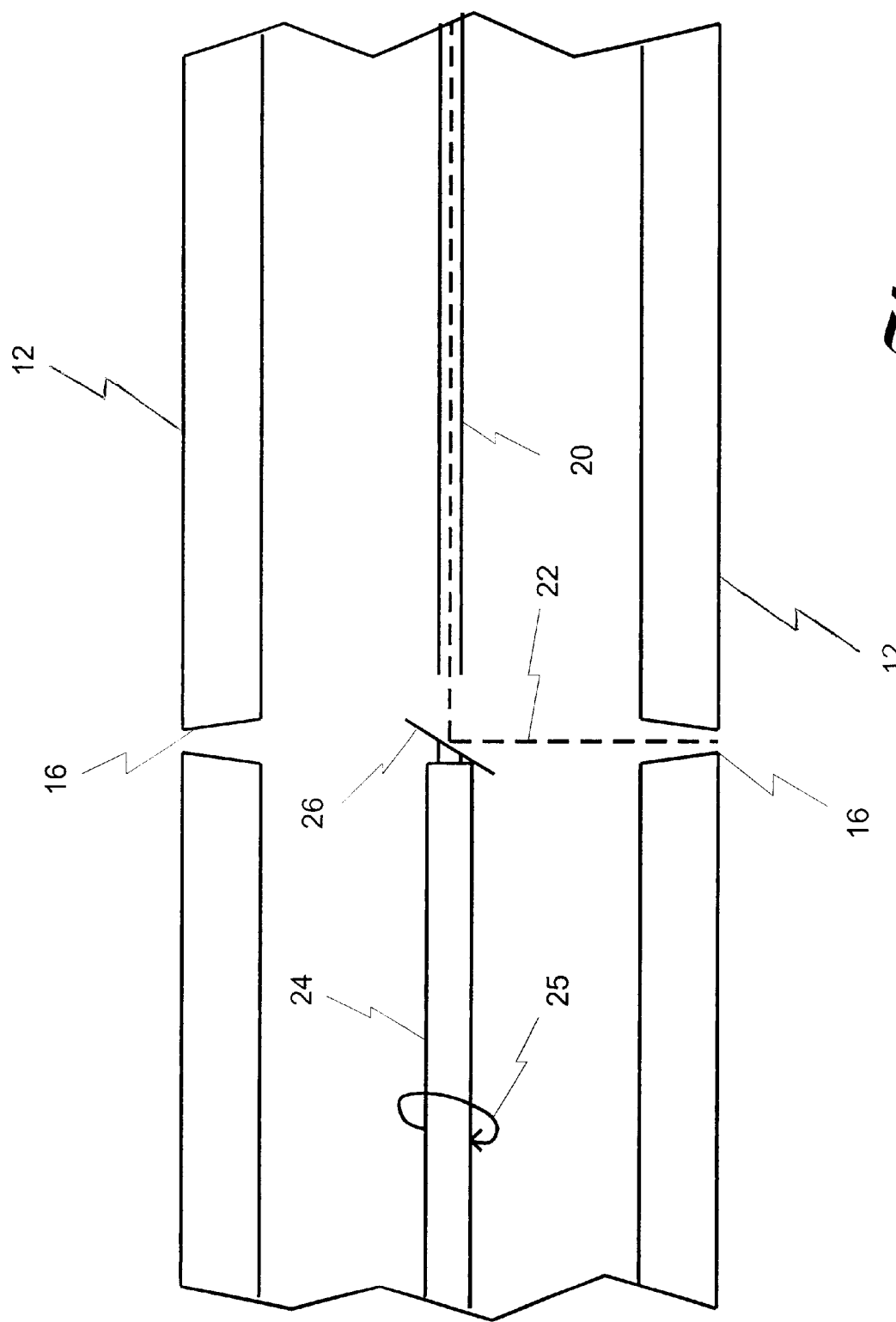
FIG. 2 is a diagram illustrating the laser focusing system of the high speed laser perforation system of the present invention.

FIG. 2 is a diagram of laser perforation system 10 illustrating the laser focusing system utilized therewith. Laser tube 20 is provided inside web-bearing cylinder 12 to direct laser beam 22 along the axis of cylinder 12. Inner cylinder 24 is also provided, rotating around the axis of cylinder 12 in the direction of arrow 25, and carrying reflecting mirror 26 to direct laser beam 22 into slit 16 of web-bearing cylinder 12. Therefore, rotation of inner cylinder 24 produces corresponding rotation of reflecting mirror 26, enabling direction of laser beam 22 to any point along the outer circumference of web-bearing cylinder 12 at slit 16. By simultaneously controlling the rate of advancement rate of web 14 on cylinder 12, the rate of rotation of inner cylinder 24, and the pulsing rate of laser beam 22, any conceivable perforation pattern maybe achieved by the present invention, with a substantial improvement over existing technology in speed and laser energy efficiency. For example, the present invention is able to perform a perforation application on a 36-inch wide web utilizing a 2.5 kilo-Watt laser pulsing at about 5–6 kilo-Hertz to form laser holes having 0.040 inch centers on 0.050 inch lines, at a speed of about 9–10 square feet per minute. A conventional galvo system would not be able to perform this application. The present invention may be further enhanced by optionally providing an exhaust and smoke blow-off arrangement in the space inside web-bearing cylinder 12 and outside inner cylinder 24 to improve the system's overall performance and ease of use.

The present invention is a continuous laser perforating system, which eliminates the "laser off" time often required by many conventional laser scanning systems to return the laser beam to a certain point on the web while performing a perforation operation. As a result, the efficiency of the system is virtually 100%, with all potential "laser on" time being utilized to perforate the web and with only the minimal "laser off" time required by the pulsing of the laser beam itself. The system of the present invention is achieved in a simple assembly that is relatively inexpensive to manufacture and maintain, implemented in an overall machine size that is comparable to the relatively compact size of existing laser scanning and galvo perforation systems.

Although the present invention has been described with reference to preferred embodiments, workers skilled in the art will recognize that changes may be made in form and detail without departing from the spirit and scope of the invention.

What is claimed is:

1. Apparatus for high speed laser perforation of a web, comprising:
    a web-bearing cylinder receiving the web in a wrapped spiral pattern, the web-bearing cylinder having a slit along a circular circumference of the web-bearing cylinder;

a laser guiding tube in the web-bearing cylinder;

a laser beam propagating through the laser guiding tube; and an inner cylinder in the web-bearing cylinder, the inner cylinder having an axis, supporting a reflecting mirror adjacent to the laser guiding tube to direct the laser beam in the slit in the web-bearing cylinder, and being rotatable around the axis to adjust an orientation of the reflecting mirror and thereby direct the laser beam around the circular circumference of the web-bearing cylinder in the slit.

2. The apparatus of claim 1, wherein the inner cylinder is arranged coaxially in the web-bearing cylinder.

3. The apparatus of claim 1, wherein the web-bearing cylinder includes an air-bearing mechanism for supporting the web with reduced friction on an outer surface of the web-bearing cylinder.

4. The apparatus of claim 1, further comprising an exhaust system between the inner cylinder and the web-bearing cylinder.

5. A method of high speed laser perforation of a web, the method comprising:

wrapping the web around an outer cylinder in a spiral pattern, the outer cylinder having a slot along a circular circumference of the outer cylinder;

advancing the web around the outer cylinder;

providing an inner cylinder in the outer cylinder, the inner cylinder supporting a reflecting mirror;

directing a laser beam toward the reflecting mirror so that the laser beam is reflected into the slit in the outer cylinder; and rotating the inner cylinder to adjust an orientation of the reflecting mirror and thereby direct the laser beam around the circular circumference of the web-bearing cylinder in the slit.

6. The method of claim 5, further comprising removing exhaust from between the inner cylinder and the outer cylinder.

\* \* \* \* \*